3,164,624
DIHYDROXYALKOXYHYDROCARBYL HYDRO-
CARBONTHIOPHOSPHONATES
David D. Reed, Glenham, and James M. Petersen,
Fishkill, N.Y., and Herman D. Kluge, deceased, late
of Fishkill, N.Y., by Hazel E. Kluge, administratrix,
Fishkill, N.Y., assignors to Texaco Inc., New York,
N.Y., a corporation of Delaware
No Drawing. Filed Oct. 18, 1962, Ser. No. 232,651
15 Claims. (Cl. 260—461)

The subject invention pertains to novel reaction products of hydroxyepoxyalkanes and hydrocarbylchalcahydroxyalkyl hydrocarbonthiophosphonates. More particularly, this invention relates to dihydroxyalkoxyhydrocarbylchalcaalkyl hydrocarbonthiophosphonates and their method of manufacture.

The term "chalca" within the meaning of this invention denotes sulfur or a mixture of sulfur and oxygen. Further, for reasons of brevity, the dihydroxyalkoxyhydrocarbylchalcaalkyl hydrocarbonthiophosphonates will hereafter be known as chalcaalkyl hydrocarbonthiophosphonates.

The chalcaalkyl hydrocarbonthiophosphonates of the invention are useful as thermal stability additives for fuels such as jet fuel.

The chalcaalkyl hydrocarbonthiophosphonates are represented by the following formula:

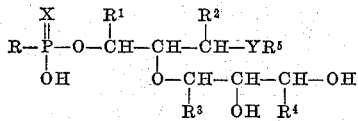

where R is hydrocarbyl (hydrocarbon derived monovalent radical); $R^1$, $R^2$, $R^3$ and $R^4$ are radicals selected from the group consisting of hydrogen and alkyl from 1 to 6 carbons; $R^5$ is an organic radical selected from the group consisting of alkyl, aryl, alkenyl, alkaryl, haloaryl and aralkyl of from 1 to 20 carbons, Y is sulfur or oxygen and X is sulfur or a mixture of sulfur and oxygen.

The chalcaalkyl hydrocarbonthiophosphonates are prepared by reacting a hydroxyepoxyalkane with hydrocarbylchalcahydroxyalkyl hydrocarbonthiophosphonate in the presence of acid as catalyst at an elevated temperature.

*Preparation of the Hydrocarbylchalcahydroxyalkyl
Hydrocarbonthiophosphonate Reactant*

The hydrocarbylchalcahydroxyalkyl hydrocarbonthiophosphonate reactant is described in copending, co-assigned application Serial No. 231,599, filed October 18, 1962. More particularly, it is formed by the reaction of hydrocarbonthiophosphonic acid of the formula:

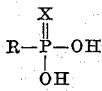

and epoxide of the formula:

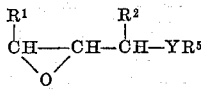

where R, $R^1$, $R^2$, $R^5$, Y and X are as heretofore defined.
The reaction is conducted at a temperature between about 25 and 175° C. preferably between about 75 and 125° C. at essentially atmospheric pressure. The ratio of reactants is advantageously between about 0.7:1 and 5:1 and desirably between about 1:1 and 2.5:1 of epoxide to thiophosphonic acid.

The thiophosphonic acid reactant is derived from a hydrocarbon-$P_2S_5$ reaction product which, in turn, is derived from the reaction of aromatic hydrocarbon, cycloaliphatic hydrocarbons and aliphatic hydrocarbons with $P_2S_5$ at elevated temperatures. Although a wide variety of hydrocarbons, from which the hydrocarbon group in the thiophosphonic acid is derived, can be used for reaction with the $P_2S_5$, olefins are generally employed. The olefinic hydrocarbons reacted with $P_2S_5$ usually contain at least 12 carbon atoms although lower molecular olefins can be employed. Mono-olefin polymers such as polyisobutylene, polybutene, polypropane, and copolymers of mono-olefins such as propylene-isobutylene copolymer are particularly preferred materials for reaction with $P_2S_5$. In general, olefin polymers and copolymers having an average molecular weight between about 250 and 50,000 are employed with polymers and copolymers having an average molecular weight in the range of about 600 to 5,000 being preferred. A specific example of a preferred mono-olefin polymer is polybutene of an average molecular weight of about 940.

In respect to X in the designated formula for hydrocarbonthiophosphonic acid, it is defined as sulfur or a mixture of sulfur and oxygen because the steam hydrolysis step in the conversion of the $P_2S_5$-hydrocarbon reaction product to thiophosphonic acid usually results in the replacement with oxygen of a portion of the sulfur joined to the phosphorus.

Specific examples of the hydrocarbylchalcahydroxyalkyl hydrocarbonthiophosphonate reactant contemplated herein are 2-hydroxy-3-butoxypropyl polybutene(940 M.W.)thiophosphonate; 2-hydroxy-3-methoxypropyl polybutene(940 M.W.)thiophosphonate; 2-hydroxy-3-phenoxypropyl polybutene(940 M.W.) thiophosphonate; 2-hydroxy-3-(2',4'-dichlorophenoxy)propyl polybutene-(940 M.W.)thiophosphonate; 2-hydroxy-3-phenylmercaptopropyl polybutene(940 M.W.)thiophosphonate; 1,3-dimethyl-2-hydroxy-3-benzylmercaptopropyl polypropylene(2500 M.W.)thiophosphonate; 1-ethyl-2-hydroxy-3-tolylmercaptopropyl polyisobutylene(2000 M.W.)thiophosphonate.

*The Hydroxyepoxyalkane Reactant*

The hydroxyepoxyalkane compounds which react with the hydrocarbonthiophosphonate to form the novel chalcaalkyl hydrocarbonthiophosphonates of the invention are represented by the general formula:

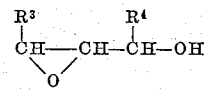

$R^3$ and $R^4$ are hydrogen or alkyl radicals from 1 to 6 carbon atoms. Specific examples of the hydroxyepoxyalkanes contemplated herein are 1-hydroxy-1-methyl-2,3-epoxybutane, 3-hydroxy-1,2-epoxypropane (glycidol), 1-hydroxy-1-ethyl-2,3-epoxypentane.

*Catalyst*

For the yield to be significant in the manufacture of chalcaalkyl hydrocarbon thiophosphonates, an acid environment should be present. Examples of the acid catalysts contemplated herein are the Lewis acids, mineral acids, and organic acids. Specific examples are $BF_3 \cdot C_2H_5OC_2H_5$, $BF_3$, $HF$, $AlCl_3$, $SnCl_4$, $TiCl_4$, $ZnCl_2$, $H_2SO_4$, $H_3PO_4$, and $CCl_3CO_2H$.

Preparation of the Chalcaalkyl Hydrocarbon Thiophosphonates Product of the Invention Specifically, chalcaalkyl hydrocarbonthiophosphonates of the formula:

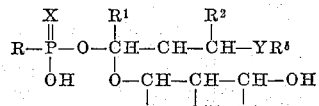

where $R^1$, $R^2$, $R^3$, $R^4$, $R^5$, Y and X are heretofore defined, are prepared by reacting the hydrocarbonthiophosphonate of the formula:

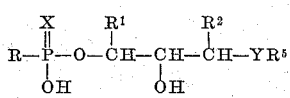

with an hydroxyepoxyalkane of the formula:

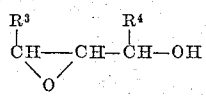

in the presence of an acid as catalyst, at a temperature between about 25 and 150° C., in a mole ratio of epoxyalkane to thiophosphonate reactant to catalyst of between about 0.1:1:0.01 and 5:1:0.1 for a period of between 1 and 2 hours. Although atmospheric pressure is normally employed, subatmospheric and superatmospheric pressure may be utilized. The chalcaalkyl hydrocarbonthiophosphonate product may be purified by any standard means such as removing unreacted reactants by fractional distillation under reduced pressure (e.g., between 0.1 and 30 mm. Hg) and elevated temperature (e.g., between 50 and 125° C.) utilizing an inert gas (nitrogen) flush.

The following examples further illustrate the invention but are not to be construed as limitations thereof. Examples I to VI represent preparation of various chalcaalkyl hydrocarbonthiophosphonates.

Example I

To a liter, 3-necked flask equipped with a stirrer, thermometer and gas inlet tube there was added 323 grams of a naphthenic base lube oil solution (Visc.=100 SUS at 100° F.) containing 0.1 mole of 2-hydroxy-3-allyloxypropyl polybutene(940 M.W.)thiophosphonate of the formula:

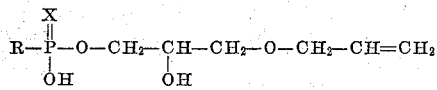

where R is a polybutene radical of a 940 average molecular weight and X is a mixture of sulfur and oxygen, of a 0.51 wt. percent sulfur content. To the thiophosphonate there was added 7.5 grams (0.1 mole) glycidol and 1.5 grams (0.11 mole) boron trifluoride-etherate $$(BF_3 \cdot C_2H_5OC_2H_5)$$

The reaction mixture was heated to 93° C. utilizing a nitrogen gas flush for a period of 2 hours. The final product was stripped at 100° C. (1–2 mm. Hg) utilizing nitrogen as the stripping agent. After stripping, the residual product was shown by analysis to be 2-(2',3' dihydroxypropoxy)-3-alloxypropyl polybutene(940 M.W.) thiophosphonate of the formula:

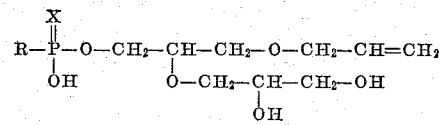

where R and X are as heretofore defined. This product analyzed as follows:

| Description | Calculated | Found |
|---|---|---|
| Phosphorus, wt. Percent | 0.94 | 0.86 |
| Hydroxyl No | 34 | 27 |
| Neut. No | 0 | 4.7 |
| Mole ratio epoxide/thiophosphonate reactants | 1 | 1 |

Example II

The procedure of Example I was repeated except for the thiophosphonate reactant there was employed 257 grams of an oil solution containing 0.1 mole of 2-hydroxy-3-methoxypropyl polybutene (940 M.W.)thiophosphonate of the formula:

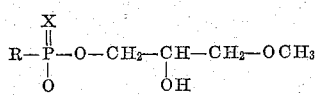

where R is a polybutene radical of an average molecular weight of 940 and X is a mixture of sulfur and oxygen, (0.51 wt. percent sulfur). The residual product remaining after stripping was found to be 2-(2',3'-dihydroxypropoxy)-3-methoxypropyl polybutene(940 M.W.)thiophosphonate where R and X are as heretofore defined. This product analyzed as follows:

| Description | Calculated | Found |
|---|---|---|
| Phosphorus, wt. Percent | 1.17 | 1 |
| Hydroxyl No | 38.4 | 27 |
| Neut. No | 0 | 4.9 |

Example III

The procedure of Example I was essentially repeated except the thiophosphonate reactant used was 261 grams of an oil solution containing 0.1 mole of 2-hydroxy-3-butoxypropyl polybutene(940 M.W.)thiophosphonate of the formula:

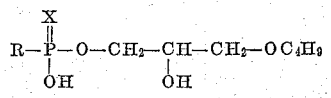

where R is a polybutene radical having an average molecular weight of 940 and X is a mixture of sulfur and oxygen, (0.51 wt. percent sulfur). The residual product remaining after stripping was found to be 2-(2',3'-dihydroxypropoxy) - 3 - butoxypropyl polybutene(940 M.W.)thiophosphonate of the formula:

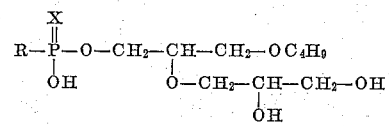

where R and X are as heretofore defined. The product analyzed as follows:

| Description | Calculated | Found |
|---|---|---|
| Phosphorus, wt. percent | 1.16 | 1.0 |
| Hydroxyl No | 41.7 | 29 |
| Neutralization No | 0 | 6.03 |
| Mole ratio epoxide/thiophosphonate reactants in product | 1.0 | 1.0 |

Example IV

The procedure of Example I was essentially repeated except the thiophosphonate reactant employed was 325 grams of an oil solution containing 0.1 mole of 2-hydroxy-3-phenoxypropyl polybutene(940 M.W.)thiophosphonate of the formula:

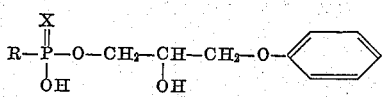

where R is a polybutene radical of an average molecular weight of 940 and X is a mixture of sulfur and oxygen. The stripped residual reaction product was identified as 2 - (2',3' - dihydroxypropoxy) - 3 - phenoxypropyl polybutene(940 M.W.)thiophosphonate of the formula:

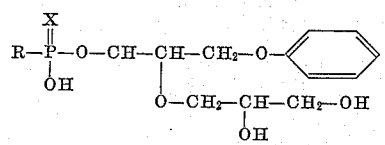

where R and X are as heretofore defined. The product analyzed as follows:

| Description | Calculated | Found |
|---|---|---|
| Phosphorus, wt. percent | 0.94 | 0.84 |
| Hydroxyl No | 33.3 | 29 |
| Neut. No | 0 | 4.9 |

*Example V*

The procedure of Example I was essentially repeated except the thiophosphonate reactant employed was 270 grams of an oil solution containing 0.1 mole of 2-hydroxy - 3 - (2',4' - dichlorophenoxy)propyl polybutene-(940 M.W.)thiophosphonate. The reaction product was identified as 2 - (2',3' - dihydroxypropoxy) - 3 - (2',4'-dichlorophenoxy)propyl polybutene(940 M.W.)thiophosphonate of the formula:

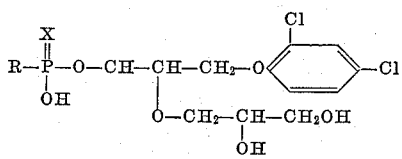

where R and X are as heretofore defined. This product analyzed as follows:

| Description | Calculated | Found |
|---|---|---|
| Phosphorus, wt. percent | 1.12 | 0.87 |
| Hydroxyl No | 35.1 | 41 |
| Neut. No | 0 | 4.2 |

*Example VI*

The procedure of Example I was essentially repeated except the thiophosphonate reactant employed 265 grams of an oil solution containing 0.1 mole of 2-hydroxy 3-phenylmercaptopropyl polybutene(940 M.W.)thiophosphonate of the formula:

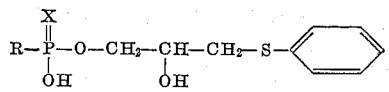

where R is a polybutene radical of an average molecular weight of 940 and X is a mixture of sulfur and oxygen, (0.51 wt. percent sulfur). The final stripped residual reaction product was found to be 2-(2',3'-dihydroxypropoxy)-3 - phenylmercaptopropyl polybutene(940 M.W.)-thiophosphonate of the formula:

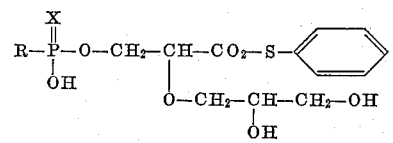

where R and X are as heretofore defined. This product analyzed as follows:

| Description | Calculated | Found |
|---|---|---|
| Phosphorus, wt. percent | 1.14 | 0.95 |
| Sulfur, wt. percent | 1.69 | 1.8 |
| Hydroxyl No | 38.7 | 43 |
| Neut. No | 0 | 1.54 |

We claim:
1. A dihydroxyalkoxyhydrocarbylchalcaalkyl hydrocarbonthiophosphonate of the formula:

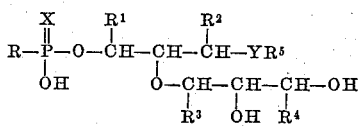

where R is hydrocarbyl derived from an aliphatic polyolefin having an average molecular weight between 250 and 50,000, $R^1$, $R^2$, $R^3$ and $R^4$ are selected from the group consisting of hydrogen and alkyl of from 1 to 6 carbons, $R^5$ is an organic member of not more than 20 carbons selected from the group consisting of alkyl, phenyl, alkylphenyl, phenylalkyl, haloaryl and alkenyl, X is selected from the group consisting of sulfur and a mixture consisting of a major portion of sulfur and a minor portion of oxygen and Y is a chalcogen selected from the group consisting of sulfur and oxygen.

2. A thiophosphonate in accordance with claim 1 wherein X is a mixture consisting of a major portion of sulfur and a minor portion of oxygen and $R^1$, $R^2$, $R^3$ and $R^4$ are hydrogen.

3. A thiophosphonate in accordance with claim 2 wherein R is a polybutene of an average molecular weight of 940, $R^5$ is allyl, and Y is oxygen.

4. A thiophosphonate in accordance with claim 2 wherein R is a polybutene having an average molecular weight of 940, $R^5$ is methyl and Y is oxygen.

5. A thiophosphonate in accordance with claim 2 wherein R is a polybutene having an average molecular weight of 940, $R^5$ is butyl and Y is oxygen.

6. A thiophosphonate in accordance with claim 2 wherein R is a polybutene having an average molecular weight of 940, $R^5$ is phenyl and Y is oxygen.

7. A thiophosphonate in accordance with claim 2 wherein R is a polybutene having an average molecular weight of 940, $R^5$ is 2',4'-dichlorophenyl and Y is oxygen.

8. A thiophosphonate in accordance with claim 2 wherein R is a polybutene having an average molecular weight of 940, $R^5$ is phenyl and Y is sulfur.

9. A method of preparing a dihydroxyalkoxyhydrocarbylchalcaalkyl hydrocarbonthiophosphonate of the formula:

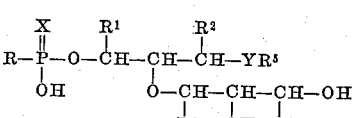

where R is hydrocarbyl derived from an aliphatic polyolefin having and average molecular weight between 250 and 50,000, $R^1$, $R^2$, $R^3$ and $R^4$ are selected from the group consisting of hydrogen and alkyl from 1 to 6 carbons, $R^5$ is an organic member of not more than 20 carbons selected from the group consisting of alkyl, alkenyl, phenyl, alkylphenyl, phenylalkyl and haloaryl, X is selected from the group consisting of sulfur and a mixture consisting of a major portion of sulfur and a minor portion of oxygen and Y is a chalcogen selected from the group consisting of sulfur and oxygen, said method comprising contacting a hydrocarbylchalcahydroxyalkyl hydrocarbonthiophosphonate of the formula:

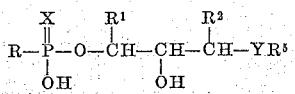

$$R-\underset{\underset{OH}{|}}{\overset{\overset{X}{\|}}{P}}-O-\underset{OH}{\overset{R^1}{\underset{|}{CH}}}-CH-\overset{R^2}{\underset{|}{CH}}-YR^5$$

with a hydroxyepoxyalkane of the formula:

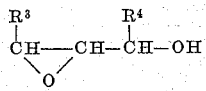

$$\underset{\diagdown\!O\!\diagup}{\overset{R^3}{\underset{|}{CH}}-CH}-\overset{R^4}{\underset{|}{CH}}-OH$$

where $R^1$, $R^2$, $R^3$, $R^4$, $R^5$, X and Y are as heretofore defined in the presence of an acid catalyst selected from the group consisting of $BF_3 \cdot C_2H_5OC_2H_5$, $BF_3$, HF, $AlCl_3$, $SnCl_4$, $TiCl_4$, $ZnCl_2$, $H_2SO_4$, $H_3PO_4$, and $CCl_3CO_2H$ at a temperature between about 50 and 125° C. and a mole ratio of hydroxyepoxyalkane to thiophosphonate reactant to catalyst of between about 0.1:1:0.01 and 5:1:0.1.

10. A method in accordance with claim 9 wherein R is a polybutene having an average molecular weight of 940, $R^1$, $R^2$, $R^3$ and $R^4$ are hydrogen, $R^5$ is allyl, Y is oxygen and X is a mixture consisting of a major portion of sulfur and a minor portion of oxygen and said catalyst is boron trifluoride etherate.

11. A method in accordance with claim 9 wherein R is a polybutene having an average molecular weight of 940, $R^1$, $R^2$, $R^3$, and $R^4$ are hydrogen, $R^5$ is methyl, Y is oxygen and X is a mixture consisting of a major portion of sulfur and a minor portion of oxygen and said catalyst is boron trifluoride etherate.

12. A method in accordance with claim 9 wherein R is a polybutene having an average molecular weight of 940, $R^1$, $R^2$, $R^3$ and $R^4$ are hydrogen, $R^5$ is butyl, Y is oxygen and X is a mixture consisting a major portion of sulfur and a minor portion of oxygen and said catalyst is boron trifluoride etherate.

13. A method in accordance with claim 9 wherein R is a polybutene having an average molecular weight of 940, $R^1$, $R^2$, $R^3$ and $R^4$ are hydrogen, $R^5$ is phenyl, Y is oxygen and X is a mixture consisting of a major portion of sulfur and a minor portion of oxygen and said catalyst is boron trifluoride etherate.

14. A method in accordance with claim 9 wherein R is a polybutene having an average molecular weight of 940, $R^1$, $R^2$, $R^3$, and $R^4$ are hydrogen, $R^5$ is 2',4'-dichlorophenyl, Y is oxygen and X is mixture consisting of a major portion of sulfur and a minor portion of oxygen and said catalyst is boron trifluoride etherate.

15. A method in accordance with claim 9 wherein R is a polybutene having an average molecular weight of 940, $R^1$, $R^2$, $R^3$ and $R^4$ are hydrogen, $R^5$ is phenyl, Y is sulfur and X is a mixture consisting of a major portion of sulfur and a minor portion of oxygen and said catalyst is boron trifluoride etherate.

No references cited.